United States Patent
Kim et al.

(10) Patent No.: US 6,931,210 B2
(45) Date of Patent: Aug. 16, 2005

(54) BIT-RATE-INDEPENDENT OPTICAL RECEIVER

(75) Inventors: Sang-Ho Kim, Seoul (KR); Seong-Taek Hwang, Pyeongtaek-shi (KR); Jun-Ho Koh, Songnam-shi (KR); Yun-Je Oh, Suwon-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 682 days.

(21) Appl. No.: 09/946,211

(22) Filed: Sep. 5, 2001

(65) Prior Publication Data

US 2002/0027695 A1 Mar. 7, 2002

(30) Foreign Application Priority Data

Sep. 6, 2000 (KR) .......................................... 2000-52682

(51) Int. Cl.[7] .................. H04B 10/00; H04B 10/12; H04B 10/16; H04B 10/20; H04B 10/08
(52) U.S. Cl. .................... 398/155; 398/175; 398/27; 375/214
(58) Field of Search .......................... 398/27, 154, 155, 398/36, 175; 375/224, 225, 214; 370/352, 395.62; 327/165; 379/93.33

(56) References Cited

U.S. PATENT DOCUMENTS

2001/0046076 A1 * 11/2001 Kim et al. ................... 359/124

FOREIGN PATENT DOCUMENTS

EP 0878926 A2 11/1998
GB 2310555 A 8/1997

OTHER PUBLICATIONS

Song; et al. "Design and Characterization of a 10 Gb/s Clock and Data Recovery Circuit Implemented with Phase-Locked Loop"; ETRI Journal, vol. 21, No. 3, Sep. 1999, pp. 1–5.

* cited by examiner

Primary Examiner—Jason Chan
Assistant Examiner—Nathan Curs
(74) Attorney, Agent, or Firm—Cha & Reiter, L.L.C.

(57) ABSTRACT

Disclosed is a bit-rate-independent optical receiver including: a bit rate sensing unit for optoelectrically converting an input optical signal, while outputting a bit rate sensing signal; a variation sensing unit for outputting a bit rate variation sensing signal; a temperature sensing unit for sensing an internal temperature and outputting a temperature sensing signal; a signal reproducing unit for reproducing data and clocks, and in response to a clock correction signal, reproducing the data and clocks based on the clock correction signal; and, a control unit for calculating the bit rate based on the voltage level of the bit rate sensing signal in response to receiving the variation sensing signal, and compensating the calculated bit rate for errors resulting from a variation in temperature, and outputting a clock correction signal indicative of the temperature-compensated bit rate to the signal reproducing unit.

5 Claims, 4 Drawing Sheets

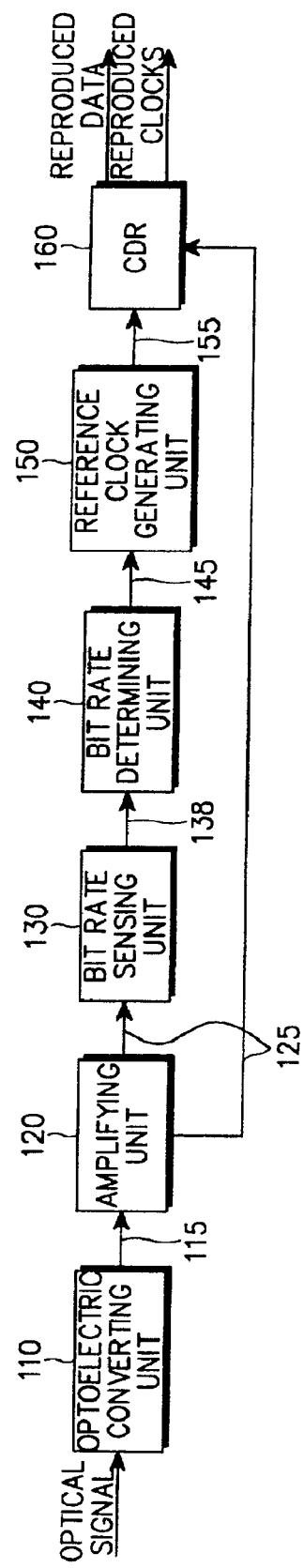
FIG. 1 [PRIOR ART]
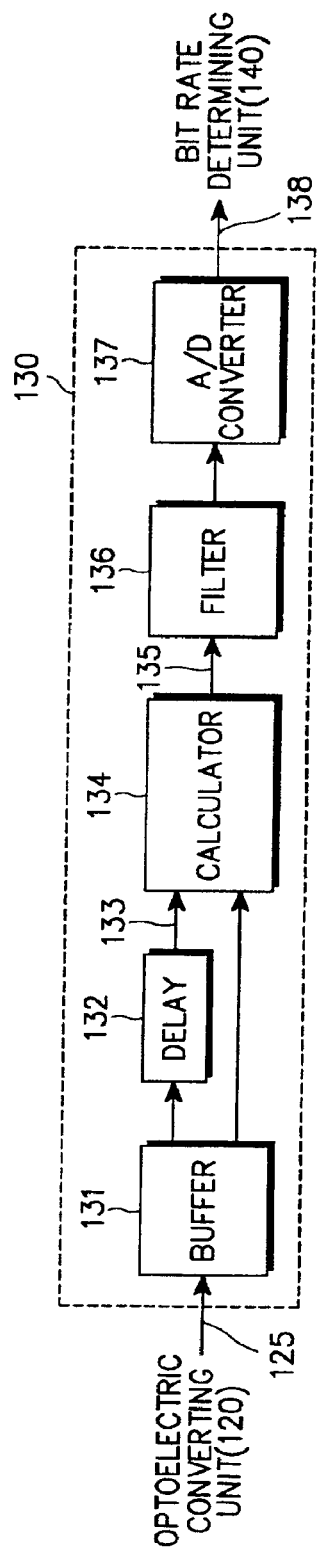
FIG. 2 [PRIOR ART]

BIT-RATE-INDEPENDENT OPTICAL RECEIVER

CLAIM OF PRIORITY

This application makes reference to and claims all benefits accruing under 35 U.S.C. Section 119 from an application entitled, "BIT-RATE-INDEPENDENT OPTICAL RECEIVER," filed in the Korean Industrial Property Office on Sep. 6, 2000, and there duly assigned Ser. No. 00-52682.

BACKGROUND OF THE INVENTION

1. Field of the Invention

The present invention relates to an optical transmission system and particularly to a bit-rate-independent optical receiver that is capable of operating a bit rate in an independent manner.

2. Description of the Related Art

A light transmission system can adopt various protocols, such as FDDI (Fiber Distributed Data Interface), ESCON (Enterprise Systems Connectivity), Fiber Channel, Gigabit Ethernet, and ATM (Asynchronous Transfer Mode) for high-bandwidth and high-bit-rate communications. Fiber optics technology can adopt various bit rates of 125 Mb/s, 155 Mb/s, 200 Mb/s, 622 Mb/s, 1062 Mb/s, 1.25 Gb/s, and 2.5 Gb/s to supply the capacity to meet the demand for multimedia applications. In operation, the light transmission system adopts one set of protocols as a multiplexing format for using any number of bit rates. In this type of light transmission system, the bit rate of an optical signal is set previously to a specific rate, such that an optical receiver can be designed to match the incoming bit rate. The function of an optical receiver is to convert an input optical signal into an electric signal and thereafter restore the electric signal to the original data that is noise-free.

FIG. 1 is a block diagram illustrating a conventional bit-rate-independent optical receiver. As shown in FIG. 1, the prior art optical receiver includes an optoelectric converting unit 110, an amplifying unit 120, a bit rate sensing unit 130, a bit rate determining unit 140, a reference clock generating unit 150, and a CDR (Clock and Data Recovery) 160.

In operation, the converting unit 110 converts an input optical signal into an electrical signal in the form of a photosensitive signal 115. A photodiode may be used for the converting unit 110. The amplifying unit 120 amplifies the photosensitive signal 115 is outputted from the converting unit 110 to output an amplified photosensitive signal 125. The amplified photosensitive signal 125 has a standardized voltage level. The voltage level of the amplified photosensitive signal 125 is set to "1" at a maximum and "0" at a minimum.

The bit-rate sensing unit 130 generates an electrical signal with pulses proportionate, in number, to the bit rate of the standardized photosensitive signal 125. The electrical signal is filtered and converted into a digital signal to be outputted as a bit-rate sensing signal 138. The bit-rate sensing signal 138 comprises a voltage level proportionate to the bit rate of the photosensitive signal 125—i.e., the input optical signal. FIG. 2 is a block diagram illustrating the bit-rate sensing unit 130. As shown in FIG. 2, the bit-rate sensing unit 130 includes a buffer 131, a delay 132, a calculator 134, a filter 136, and an analog/digital (A/D) converter 137. The buffer 131 distributes the photosensitive signal 125 received from the amplifying unit 120 to the delay 132 and calculator 134.

The delay 132 generates a delay signal 133 delayed from the photosensitive signal 125 by a desired time and applies the delay signal 133 to the calculator 134. The calculator 134 exclusively OR's the photosensitive signal 125, directly received from the buffer 131, with the delay signal 133 received from the delay 132, thus outputting a recognition signal 135. The recognition signal 135 includes the form of a number of pulses with a high level interval that is equal to the delay time of the delay 132. When the input photosensitive signal 125 varies in response to the change in the bit rate, the number of pulses in the recognition signal 135 varies. Hence, the variation in the number of pulses in the recognition signal 135 is proportionate to the bit rate of the photosensitive signal 125. The filter 136 low-pass filters the recognition signal 135 received from the calculator 134, then outputs a filtered signal. The A/D converter 137 converts the filtered signal, which is the form of an analog signal, into a digital signal to be outputted as a bit rate sensing signal 138.

With continued reference to FIG. 1, the bit rate determining unit 140 determines the bit rate of the photosensitive signal 125 in response to the voltage level of the bit rate sensing signal 138, then outputs a clock correction signal 145 that is indicative of the determined bit rate. Thereafter, the reference clock generating unit 150 generates a reference clock according to the clock correction signal 145. Based on the reference clock, the CDR 160 reproduces the data and clocks of the photosensitive signal 125 and outputs the reproduced data and clocks.

However, the above-mentioned conventional bit-rate-independent optical receiver has a configuration in which one bit rate sensing unit and one bit rate determining unit must be allocated for each optical signal. Consequently, a plurality of optical signals that are capable of handling different bit rates is required if the bit-rate-independent optical receiver is applied as the input section of an optoelectric cross-connect (OEXC) system. It is then difficult to individually manage the required multiple number of the bit-rate sensing units and the bit-rate determining units. Therefore, it is very difficult to implement a centralized configuration that can be implemented as the bit-rate-independent optical receiver using the conventional system architecture.

Furthermore, the conventional bit-rate-independent optical receiver has a problem in which it is difficult to modulize elements adapted to process signals and control those signal is processing elements. Accordingly, it is disadvantageous to facilitate the addition or removal of the signal processing elements upon demand.

SUMMARY OF THE INVENTION

The present invention is directed to provide a bit-rate-independent optical receiver that is capable of operating in a receive mode at a different maximum or optimal bit rate and capable of easily achieving centralization and modulization thereof.

In accordance with one aspect, the present invention provides a bit-rate-independent optical receiver which includes: a bit rate sensing unit for outputting a photosensitive signal optoelectrically converted from an input optical signal while outputting a bit rate sensing signal with a voltage level that is indicative of the bit rate of the photosensitive signal; a variation sensing unit for outputting a variation sensing signal when a variation in the bit rate occurs; a temperature sensing unit for sensing an internal temperature of the bit rate sensing unit and for outputting a temperature sensing signal that is indicative of the sensed internal temperature; a signal reproducing unit for reproducing the data and clocks of the photosensitive signal based on a predetermined reference clock while, in response to the reception of a clock correction signal, reproducing the data and clocks of the photosensitive signal based on the reference clock corresponding to the clock correction signal; and, a control unit for calculating the bit rate of the photosensitive signal based on the voltage level of the bit rate sensing signal, in response to a reception of the variation sensing signal, compensating the calculated bit rate for errors resulting from a variation in temperature based on the temperature indicated by the temperature sensing signal, and for outputting a clock correction signal indicative of the temperature-compensated bit rate to the signal reproducing unit.

In accordance with another aspect, the present invention provides a bit-rate-independent optical receiver, which includes: a plurality of bit rate sensing units each for outputting a photosensitive signal optoelectrically converted from an input optical signal, while outputting a bit rate sensing signal having a voltage level indicative of the bit rate of the photosensitive signal; a plurality of variation sensing units coupled to the respective bit rate sensing units, each of the variation sensing units serving to output a variation sensing signal when one of the associated photosensitive signals exhibits a variation in the bit rate; a plurality of temperature sensing units respectively coupled to the bit rate sensing units, each of the temperature sensing units serving to sense the internal temperature of one of the bit rate sensing units and to output a temperature sensing signal indicative of the sensed internal temperature; a plurality of signal reproducing units each for reproducing the data and clocks of the photosensitive signal, outputted from the associated one of the bit rate sensing units, based on a predetermined reference clock while, in response to the reception of a clock correction signal, reproducing the data and clocks of the photosensitive signal based on a reference clock corresponding to the clock correction signal; and, a control unit, in response to the output of the variation sensing signal, for determining the bit rate sensing unit associated with the outputting of the variation sensing signal, for calculating the bit rate of the associated one of the photosensitive signals based on the voltage level of the bit rate sensing signal outputted from the determined bit rate sensing unit, for compensating the calculated bit rate for errors resulting from a variation in temperature based on the temperature indicated by the associated one of the temperature sensing signals, and for outputting a clock correction signal indicative of the temperature-compensated bit rate to the signal reproducing unit associated with the determined bit rate sensing unit.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

BRIEF DESCRIPTION OF THE DRAWINGS

FIG. 1 is a block diagram illustrating a conventional bit-rate-independent optical receiver;

FIG. 2 is a block diagram illustrating a bit-rate sensing unit shown in FIG. 1;

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 3:
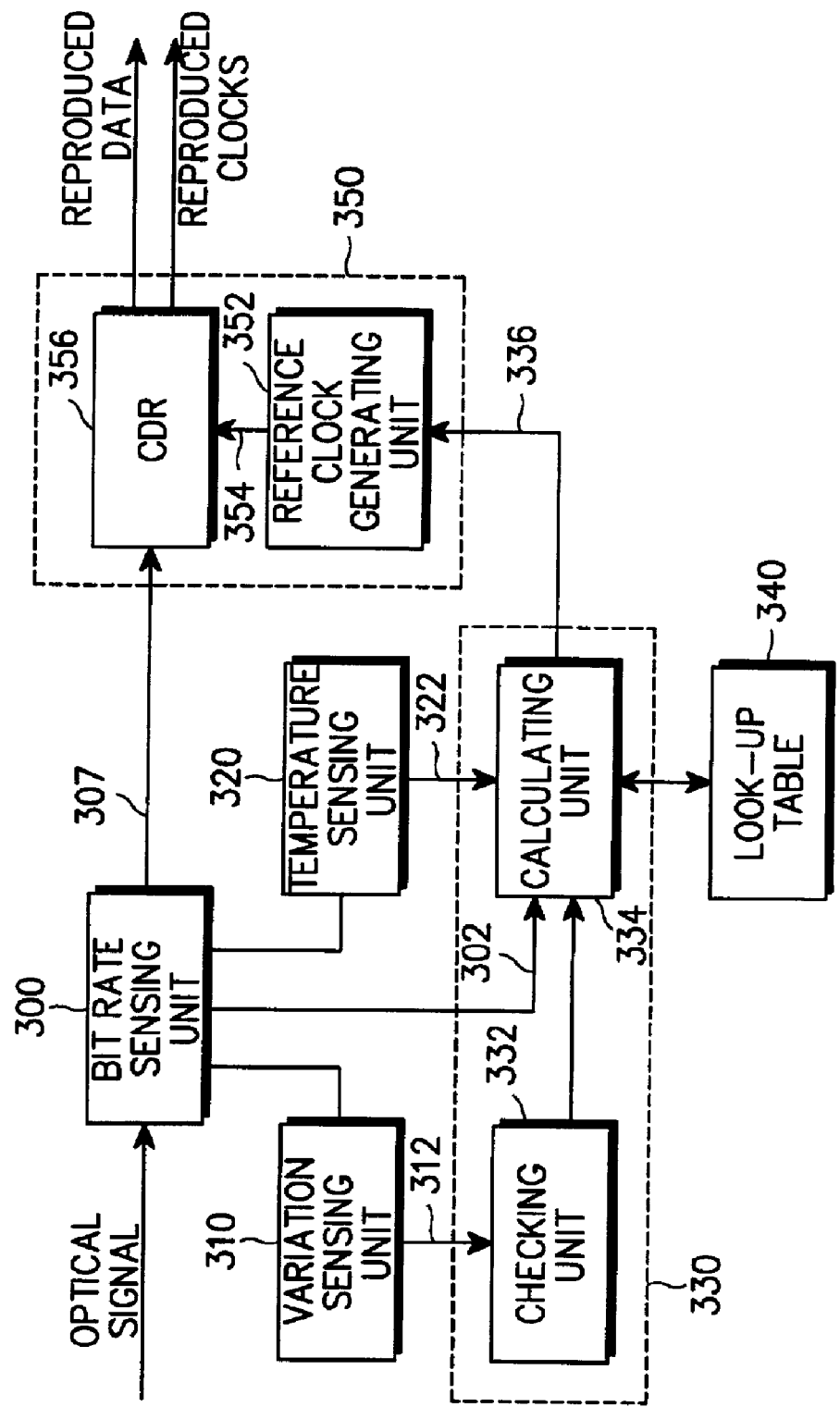
FIG. 3 is a block diagram illustrating the configuration of a bit-rate-independent optical receiver according to a preferred embodiment of the present invention.

FIG. 3 is a block diagram illustrating the configuration of a bit-rate-independent optical receiver according to a preferred embodiment of the present invention. As shown in FIG. 3, the inventive optical receiver includes a bit rate sensing unit 300, a variation sensing unit 310, a temperature sensing unit 320, a signal reproducing unit 350, and a control unit 330.

In operation, the bit rate sensing unit 300 outputs a photosensitive signal 307 optoelectrically converted from an input optical signal. The bit rate sensing unit 300 also outputs a bit rate sensing signal 302 having a voltage level indicative of the bit rate of the photosensitive signal 307.

Figure 4:
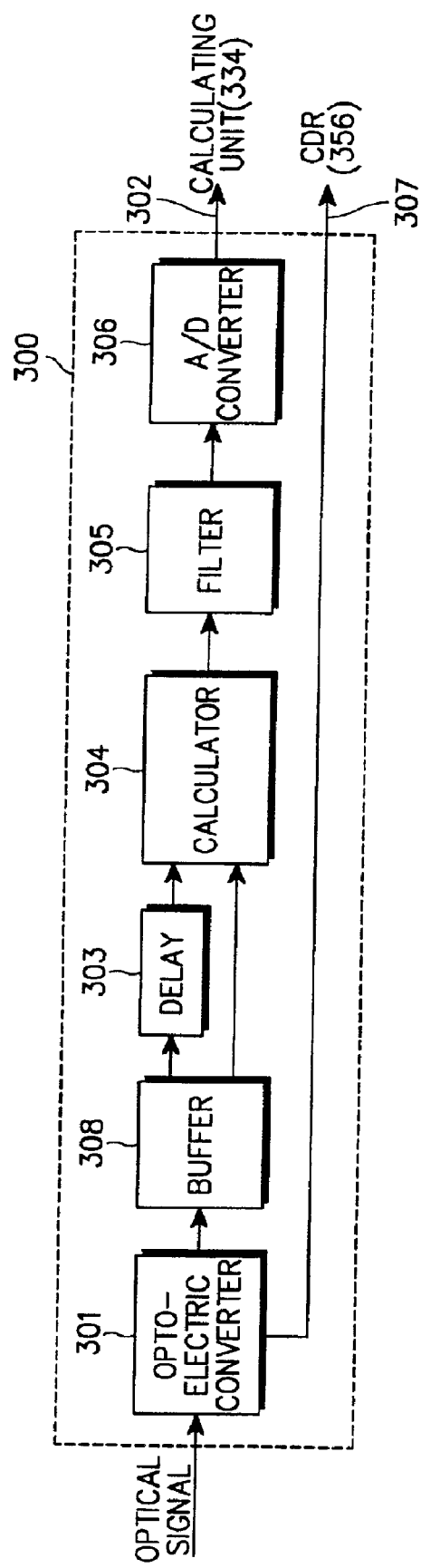
FIG. 4 is a block diagram illustrating the bit rate sensing unit shown in FIG. 3; and, FIG. 5 is a block diagram illustrating a bit-rate-independent optical receiver according to another embodiment of the present invention.

FIG. 4 is a block diagram illustrating the bit-rate sensing unit 300. As shown in FIG. 4, the bit rate sensing unit 300 includes an optoelectric converter 301, a buffer 308, a delay 303, a calculator 304, a filter 305, and an A/D converter 306. The construction and operation of the embodiment shown in FIG. 4 are essentially the same as that described above with respect to FIG. 2. Hence, a discussion of the similar components described in the preceding paragraphs is omitted to avoid redundancy, as they are described with respect to FIG. 2.

When the variation sensing unit 310 senses a variation in the bit rate of an input optical signal, it generates a variation sensing signal 312. That is, the variation sensing unit 310 compares the bit rate sensing signal, outputted just before the bit rate variation, with the bit rate sensing signal 302 outputted after the bit rate variation. Based on the comparison result, the variation sensing unit 310 outputs a variation sensing signal 312 indicative of the bit rate variation. Here, the variation sensing unit 310 may be a variation amplifier having a feedback configuration or a PLL (Phase Locked Loop) circuit. This variation sensing unit 310 uses the bit-rate sensing signal outputted just before the variation in the bit rate occurs as a reference input. The reference input is continuously updated at a predetermined time period. The variation sensing unit 310 compares the bit rate sensing signal 302 that is generated after the bit rate variation with the reference input, then outputs a variation sensing signal 312 indicative of the bit rate variation. In terms of time, the reference input precedes the bit rate sensing signal 302 generated after the bit rate variation.

Meanwhile, the temperature sensing unit 320 senses the internal temperature of the bit rate sensing unit 300 and outputs a temperature sensing signal 322 indicative of the sensed internal temperature.

The control unit 330 includes a checking unit 332 and a calculating unit 334. The checking unit 332 periodically checks whether the variation sensing signal 312 is received thereto. When the checking unit 332 detects the reception of the variation sensing signal 312, the checking unit 332 informs the calculating unit 334 of the reception of the variation sensing signal 312. When the variation sensing signal 312 is received, the calculating unit 334 calculates the bit rate of the photosensitive signal 307 based on the voltage level of the bit rate sensing signal 302. Thereafter, the calculating unit 334 compensates the calculated bit rate for errors resulting from a variation in temperature based on the temperature level indicated by the temperature sensing signal 322, then outputs a clock correction signal 336 indicative of the temperature-compensated bit rate to the reference clock generating unit 352. For the calculation of the temperature-compensated bit rate, the calculating unit 334 retrieves the associated temperature-dependent bit rate error from a look-up table 340. The calculating unit 334 then compensates the calculated bit rate for the read error, thereby calculating a temperature-compensated bit rate. It is noted that the clock correction signal 336 indicative of the temperature-compensated bit rate may also be used as a reference input of the variation sensing unit 310.

The signal reproducing unit 350 includes a reference clock generating unit 352 and a CDR 356. The reference clock generating unit 352 generates a predetermined reference clock while generating a reference clock signal 354 corresponding to the clock correction signal 336 received from the control unit 330. The signal reproducing unit 350 generates the predetermined reference clock where there is no variation in the bit rate of the photosensitive signal 307. However, when the clock correction signal 336 indicates a variation in the bit rate that is inputted, the signal reproducing unit 350 generates the reference clock 354 corresponding to the clock correction signal 336. The CDR 356 produces and outputs the data and clocks of the photosensitive signal 307 in response to the reference clock signal 354.

Figure 5:
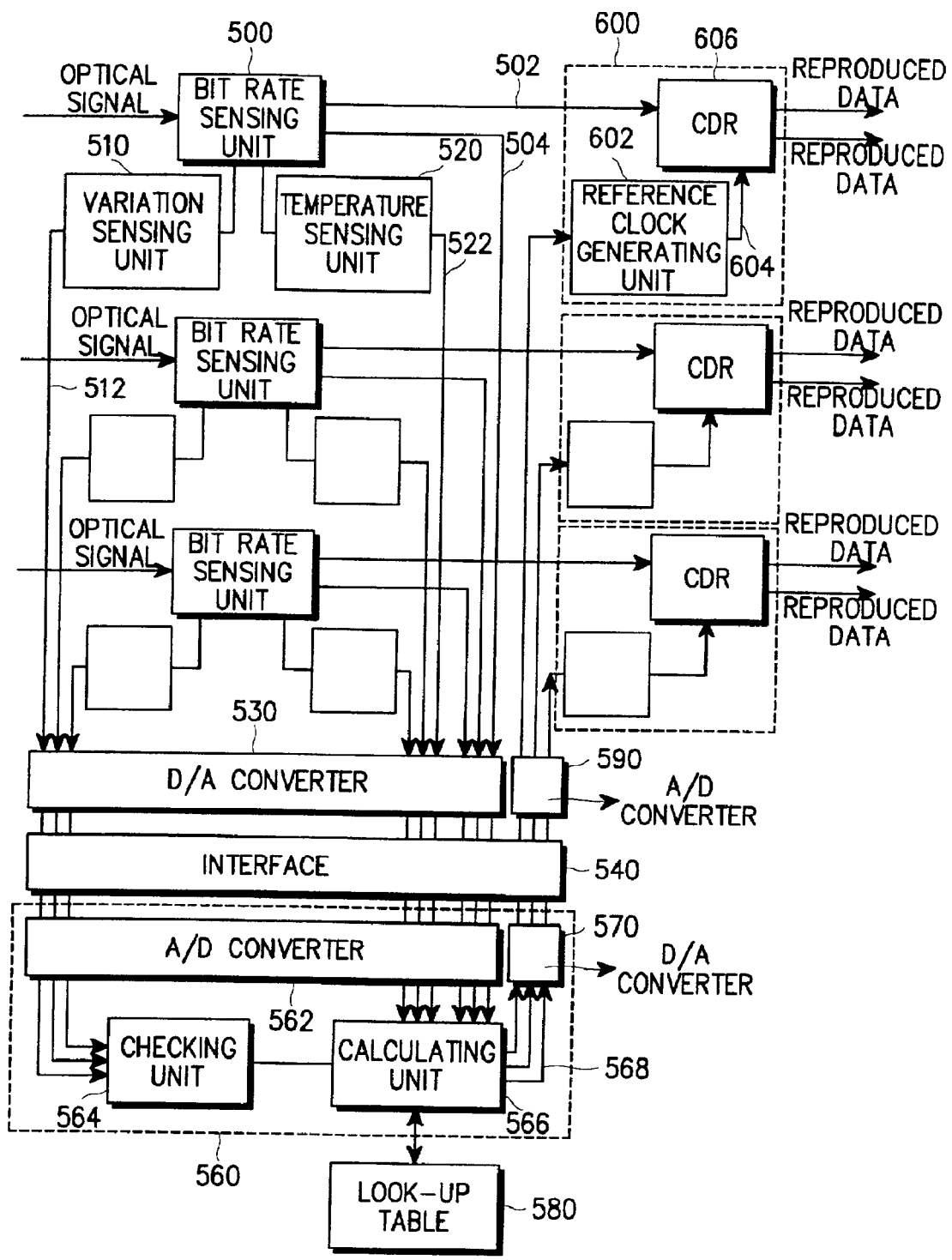

FIG. 5 is a block diagram illustrating a bit-rate-independent optical receiver according to another embodiment of the present invention. As shown in FIG. 5, the optical receiver includes a plurality of bit rate sensing units 500, variation sensing units 510, temperature sensing units 520, signal reproducing units 600, a D/A converter 530, an interface 540, a control unit 560, and an A/D converter 590.

In operation, each bit-rate sensing unit 500 outputs a photosensitive signal 502 optoelectrically converted from an input optical signal. Each bit rate sensing unit 500 also outputs a bit rate sensing signal 504 having a voltage level indicative of the bit rate of the photosensitive signal 502. The construction and operation of the bit-rate sensing unit 500 are essentially the same as that described above with respect to FIG. 4. The only notable difference is that a plurality of bit-rate sending units 500 is provided to convert an optical signal into an electrical signal, and to generate the bit rate sensing signal 504. Hence, a discussion of similar components described in the preceding paragraphs is omitted to avoid redundancy, as they are described with respect to FIG. 4.

A number of variation sensing units 510 is coupled to the respective bit rate sensing unit 500. When one of the variation sensing units 510 senses a variation in the bit rate of a photosensitive signal 502 associated therewith, it generates a variation sensing signal 512.

Each temperature sensing unit 520 is coupled to the respective bit rate sensing units 500 and adaptively operative to sense the internal temperature of the respective bit rate sensing unit 500 and to output a temperature sensing signal 522 indicative of the sensed internal temperature.

The D/A converter 530 converts the bit-rate sensing signal 504 outputted from each bit rate sensing unit 500 and the variation sensing signal 512 outputted from each variation sensing unit 510 into analog signals, respectively.

The interface 540 transfers the bit rate sensing signal 504 outputted from each bit rate sensing unit 500 to the control unit 560, the variation sensing signal 512 outputted from each variation sensing unit 510, and the temperature sensing signal 522 outputted from each temperature sensing unit 520. The interface 540 also transfers each clock correction signal 568 outputted from the control unit 560 to the respective signal reproducing units 600. The interface 540 serves as a transfer medium for input/output signals associated with the control unit 560 of the bit-rate-independent optical receiver.

The control unit 560 includes an A/D converter 562, a checking unit 564, a calculating unit 566, and a D/A converter 570. The A/D converter 562 converts analog signals, received via the interface 540, into digital signals, respectively. The checking unit 564 checks the output of a variation sensing signal 512 and the bit rate sensing unit 500 associated with the output of the variation sensing signal 512, and informs the calculating unit 566 of the results of the checking operation. When a variation sensing signal 512 is outputted, the calculating unit 566 calculates the bit rate of the photosensitive signal 502 associated with the variation sensing signal 512 based on the voltage level of the bit rate sensing signal 504 outputted from the checked bit rate sensing unit 500. Thereafter, the calculating unit 566 compensates the calculated bit rate for errors resulting from a variation in temperature based on the temperature indicated by the temperature sensing signal 522 that is outputted from one of the associated temperature sensing units 520. The calculating unit 566 then outputs a clock correction signal 568 indicative of the temperature-compensated bit rate. For the calculation of the temperature-compensated bit rate, the calculating unit 566 reads the associated temperature-dependent bit rate error from a look-up table 580. The calculating unit 566 then compensates the calculated bit rate for the read error, thereby calculating a temperature-compensated bit rate.

The D/A converter 570 converts the clock correction signal 568 into an analog signal. This analog clock correction signal 568 is applied to the A/D converter 590 via the interface 540. The A/D converter 590 converts the clock correction signal 568 into a digital signal, which is, in turn, forwarded to the reference clock generating unit 602 of the respective signal reproducing units 600.

Each signal reproducing unit 600 reproduces the data and clocks of the photosensitive signal 502 outputted from the respective bit rate sensing units 500 in response to the reference clock of the signal reproducing unit 600. When the clock correction signal 568 is received, the signal reproducing unit 600 reproduces data and clocks corresponding to the photosensitive signal 502 based on the received clock correction signal 568.

As apparent from the above description, the bit-rate-independent optical receiver of the present invention has the advantages of providing easy centralized control and modulization in that the control unit thereof is separated from other elements. In addition, by virtue of the easy centralized control and modulization, the bit-rate-independent optical receiver also has the advantage of making possible the addition or removal of bit rate sensing units.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A bit-rate-independent optical receiver, comprising:

a bit rate sensing unit for outputting a photosensitive signal optoelectrically converted from an input optical signal, while outputting a bit rate sensing signal having a voltage level indicative of the bit rate of the photosensitive signal;

a variation sensing unit for comparing the bit rate sensing signal outputted prior to a bit rate variation with the bit rate sensing signal outputted after the bit rate variation and to generate a variation sensing signal;

a temperature sensing unit for sensing an internal temperature of the bit rate sensing unit and for outputting a temperature sensing signal indicative of the sensed internal temperature;

a signal reproducing unit for reproducing the data and clocks of the photosensitive signal based on a predetermined reference clock while, in response to the reception of a clock correction signal, reproducing the data and clocks of the photosensitive signal based on a reference clock corresponding to the clock correction signal; and, a control unit for calculating the bit rate of the photosensitive signal based on the voltage level of the bit rate sensing signal in response to a reception of the variation sensing signal, for compensating the calculated bit rate for errors resulting from a variation in temperature based on the temperature indicated by the temperature sensing signal, and for outputting a clock correction signal indicative of the temperature-compensated bit rate to the signal reproducing unit.

2. The optical receiver according to claim 1, wherein for the calculation of the temperature-compensated bit rate, the control unit reads an associated temperature-dependent bit rate error from a predetermined table to calculate the temperature-compensated bit rate.

3. A bit-rate-independent optical receiver, comprising:

a plurality of bit rate sensing units for outputting a photosensitive signal optoelectrically converted from an input optical signal, while outputting a bit rate sensing signal having a voltage level indicative of the bit rate of the photosensitive signal;

a plurality of variation sensing units respectively coupled to the bit rate sensing units, each of the variation sensing units serving to compare the bit rate sensing signal outputted prior to a bit rate variation with the bit rate sensing signal outputted after the bit rate variation and to output a variation sensing signal when one of the photosensitive signals indicates a variation in the bit rate;

a plurality of temperature sensing units respectively coupled to the bit rate sensing units, each of the temperature sensing units serving to sense the internal temperature of one of the bit rate sensing units and to output a temperature sensing signal indicative of the sensed internal temperature;

a plurality of signal reproducing units for reproducing the data and clocks of the photosensitive signal that is outputted from one of the bit rate sensing units based on a predetermined reference clock while, in response to the reception of a clock correction signal, reproducing the data and clocks of the photosensitive signal based on a reference clock corresponding to the clock correction signal; and, a control unit, in response to the outputting of the variation sensing signal, for determining the bit rate sensing unit associated with the output of the variation sensing signal, for calculating the bit rate of one of the photosensitive signals based on the voltage level of the bit rate sensing signal outputted from the determined bit rate sensing unit, for compensating the calculated bit rate for errors resulting from a variation in temperature based on the temperature indicated by one of the temperature sensing signals, and for outputting a clock correction signal indicative of the temperature-compensated bit rate to the signal reproducing unit associated with the determined bit rate sensing unit.

4. The optical receiver according to claim 3, further comprising:

an interface serving as a transfer medium for input and output signals associated with the control unit.

5. The optical receiver according to claim 3, wherein for the calculation of the temperature-compensated bit rate, the control unit reads an associated temperature-dependent bit rate error from a predetermined table and compensates the calculated bit rate to calculate the temperature-compensated bit rate.

* * * * *